UNITED STATES PATENT OFFICE.

LOUIS DEBROISSE, OF SOUTH BELLINGHAM, MASSACHUSETTS.

FISH-BAIT.

No. 871,486.

Specification of Letters Patent.

Patented Nov. 19, 1907.

Application filed August 2, 1907. Serial No. 386,832.

*To all whom it may concern:*

Be it known that I, LOUIS DEBROISSE, citizen of the Republic of France, residing at South Bellingham, in the county of Norfolk and State of Massachusetts, have invented new and useful Improvements in Fish-Bait, of which the following is a specification.

My invention pertains to fish bait; and it contemplates the provision of a composition of matter which is tough and elastic in quality, is adapted to be conveniently handled and easily placed upon a hook, and is calculated when placed in water to soften to about the consistency of a piece of fish so as to be attractive to the fish to be caught.

My composition consists of the following ingredients, combined in about the proportions stated, viz:

| | |
|---|---|
| Water | 8.5 parts. |
| Gelatin, fish glue or equivalent substance | 4 parts. |
| Castor oil | 2.5 parts. |
| Epsom salt | 4 parts. |
| A binder, preferably wheat flour or potato flour | 4 parts. |

The ingredients stated are thoroughly mingled by agitation, and the mixture is heated to about the boiling point so as to evaporate the water to a sufficient extent to reduce the mixture to the consistency of a thick paste, whereupon the mixture is poured into molds and permitted to set.

The pieces of bait produced in the matter set forth in the foregoing are white, and hence may be readily seen in the water, and while tough and elastic and adapted to be conveniently handled may be expeditiously and easily secured on a hook in the same manner as a piece of fish.

My novel bait is designed more particularly for use in sea fishing, and when so used it is particularly advantageous inasmuch as it may be kept in a wholesome state for an indefinite period of time without the use of ice or any preservative. It is also materially advantageous for the reason that it may be packed in a compact manner so as to occupy but a minimum amount of space in a fishing boat.

When desirable a suitable ingredient may be commingled with or poured upon the pieces of bait so as to give the same any desired odor or taste calculated to attract certain species of fish.

The adaptability of my novel bait to be kept in a wholesome state without the use of ice enables a fisherman to remain on the fishing ground until his supply of bait is exhausted, and obviates the necessity of the fisherman returning to his base of supply when the ice carried for preserving bait is melted. In this connection it will be readily understood that my novel bait may, when deemed expedient, be used as auxiliary bait — that is to say, when a fisherman prefers the usual bait packed in ice, he may use that bait until the supply of bait or ice is exhausted when he may resort to the use of my novel bait and in that way continue his fishing until he secures a full cargo.

The proportions of ingredients stated are, so far as I have been able to determine by experiment, calculated to produce the best composition for the purpose stated, but I would have it understood that in the future practice of my invention the proportions of ingredients may be varied as conditions require without involving departure from the scope of my invention as claimed. I would also have it understood that without departure from my claimed invention fish oil or any other oil that is the equivalent of castor oil for the purposes of this invention may be used in lieu of the said castor oil without departing from the scope of the claims appended.

Having described my invention, what I claim and desire to secure by Letters-Patent, is:

1. A composition of matter for use as fish bait, comprising a glutinous substance, castor oil, Epsom salt, and a suitable binder.

2. The herein described composition of matter for use as fish bait, consisting of water, 8.5 parts, glutinous substance 3 parts, castor oil 2.5 parts, Epsom salt 4 parts, and binder 4 parts; the said composition being reduced to the consistency of thick paste and converted into portions of convenient shape.

3. As an article of manufacture, a tough and elastic fish bait comprising a glutinous substance, castor oil and Epsom salt.

4. As an article of manufacture, a tough and elastic fish bait comprising a glutinous substance, oil, and a substance for giving savor to the glutinous substance and oil.

5. As an article of manufacture, a tough and elastic fish bait comprising a glutinous substance, oil, a suitable binder, and a substance for giving savor to the whole.

6. A composition of matter for use as fish bait, comprising a glutinous substance, a substance for giving savor to the glutinous substance, and a suitable binder.

7. As an article of manufacture, a tough and elastic fish bait comprising a glutinous substance, and a substance for giving savor to the glutinous substance.

8. As an article of manufacture, a tough and elastic fish bait comprising a glutinous substance, a substance for giving savor to the glutinous substance, and a suitable binder.

In testimony whereof I have hereunto set my hand in presence of two subscribing witnesses.

LOUIS DEBROISSE.

Witnesses:
 ISABELLE SMITH,
 EDGAR L. SPAULDING.